United States Patent Office 3,573,269
Patented Mar. 30, 1971

3,573,269
METHOD FOR MASS POLYMERIZING VINYL CHLORIDE BASED POLYMERS AT LOW TEMPERATURE
Marc E. Carrega, Chatenay-Malabry, France, assignor to Produits Chimiques Pechiney-Saint-Gobain, du Chateau, Neuilly-sur-Seine, Franc
No Drawing. Filed Apr. 22, 1969, Ser. No. 818,406
Claims priority, application France, Apr. 25, 1968, 149,435
Int. Cl. C08f 1/04, 1/56
U.S. Cl. 260—92.8         17 Claims

ABSTRACT OF THE DISCLOSURE

A method for the preparation of polymers and copolymers based upon vinyl chloride embodying mass polymerization or copolymerization of vinyl chloride in the presence of a catalytic system formed of an (a) system prepared by reduction of a titanium compound in the presence of water or alcohol by an organo aluminum compound and the combination thereof with a peroxygenated compound such as a peroxide, hydroperoxide, perester or peracid.

This invention relates to a method for mass polymerization at low temperature of vinyl chloride based polymers and products formed thereof.

In my copending application Ser. No. 809,970, filed Mar. 24, 1969, entitled "Method for the Preparation of Vinyl Chloride Based Polymers at Low Temperature," description is made of the mass polymerization or copolymerization of monomers with a vinyl chloride base in the presence of a catalytic system formed of an (a) system containing a reducing compound of a metal selected from the sub-groups I–a to IV–a of the periodic classification of elements (Handbook of Chemistry and Physics, 45th edition. The Chemical Rubber Publishing Co., page B2) plus zinc; a compound of a transition metal of sub-groups I–b to VII–b and VIII of the periodic classification of elements, and a peroxygenated (b) compound, such as peroxides, hydroperoxides, peresters and peracids.

The (a) system is preferably formed with an organo aluminum compound having the formula

in which $R_1$, $R_2$ and $R_3$ are the same or different, and represent hydrogen atoms or possibly ramified aliphatic radicals which may contain up to 12 carbon atoms; a titanium compound having the formula

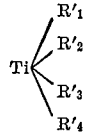

in which $R'_1$, $R'_2$, $R'_3$ and $R'_4$ are the same or different and represent halogen atoms, such as chlorine, bromine or iodine, or —OR' radicals in which R' represents a ramified or non-ramified group, alcoyl group and preferably a primary alcoyl, aryl or aralkyl group which may contain up to 20 carbon atoms.

The (a) systems were prepared by bringing together, at ordinary temperature, or with the application of heat, the organo aluminum compound and the titanium compound, with or without a solvent inert to the two metal compounds, such as a saturated hydrocarbon or mixtures of saturated hydrocarbons, the boiling points of which may be as high as 240° C. (464° F.). It has been found that the halogenated titanium compounds were easily reduced by the organo aluminum trialiphatic compounds during contact into trivalent titanium compounds, after hydrolysis, and that such was not the case with non-halogenated titanium compounds. In the latter instance, the reduction operation required long contact time. It has also been discovered that, when the reduction of the titanium compound to a trivalent titanium compound is difficult, the catalytic system embodying the trivalent titanium compound has little activity from the standpoint of polymerization.

Applicant has discovered that reduction of the non-halogenated titanium compounds by organo aluminum trialiphatic compounds is markedly accelerated and facilitated when the reduction reaction is carried out in the presence of water or alcohol. The applicant has also discovered that the addition of water or a certain category of alcohols, hereinafter defined, to the non-halogenated titanium compounds not only accelerates the operation of reduction but also the polymerization, with very greatly improved yields.

The object of this invention resides in the improvement in the preparation of polymers and copolymers based upon vinyl chloride which is achieved by polymerizing of copolymerizing in a body, a monomer composition based on vinyl chloride in the presence of a catalytic system formed of: an (a) system obtained by reduction, in the presence of water or primary non-ramified alcohols which may contain up to 20 carbon atoms, of a titanium compound having the formula

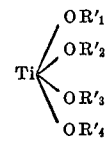

in which $R'_1$, $R'_2$, $R'_3$ and $R'_4$ are the same or different groups, and represent ramified or non-ramified groupings, preferably primary alcoyls, aryls or aralkyls containing up to 20 carbon atoms; by an organo aluminum compound having the formula

which $R_1$, $R_2$ and $R_3$ are the same or different groups, and represent possibly ramified aliphatic radicals containing up to 12 carbon atoms; and a peroxygenated (b) compound, such as peroxides, hydroperoxides, peresters and peracids.

The titanium compounds used in the preparation of the (a) system can be illustrated by n-propyl titanate, isopropyl titanate, isobutyl titanate, butyl titanate and octyl titanate.

The organo aluminum compound used to prepare the (a) system can be illustrated by triethyl aluminum and triisobutyl aluminum.

Alcohols which can be used to prepared the (a) system can be illustrated by methanol, ethanol, n-propanol, n-octanol and dodecanol.

The peroxygenated compounds of the (b) system, which can be used in the practice of this invention, can be illustrated by organic peroxides, such as perbenzoic acid; peresters of mineral or organic acids, such as perborates, percarbonates and perbenzoates; hydroperoxides, such as cumene hydroperoxide, diiso propylbenzene hydroperoxide, butyl-t-hydroperoxide, the hydroxides of ketones and aldehydes; peroxides, such as oxygenated water, cyclohexanon peroxide and particularly diacyl peroxides, such as lauroyl peroxide, benzoyl peroxide, monochloroacetyl peroxide, alpha-chlorolauroyl peroxide, alphachlorocaproyl peroxide, and alpha-alpha-dichloropropionyl peroxide.

The monomers which may be copolymerized with vinyl chloride, in accordance with the practice of this invention, can be illustrated by olefins, such as ethylene, propylene, butenes, isobutene and hexene; vinyl esters, such as acrylates, fumarates, maleates and vinyl acetate; acrylonitrile, and the ethylene-fluoro or chlorofluoro-substituted derivatives such as vinyl fluoride, vinylidene fluoride, and tetrafluorochloroethylene.

Operating temperatures, which may be used in the practice of this invention, range from $-100°$ to $+30°$ C. $(-48°$ to $+86°$ F.), and preferably within the range of $-80°$ to $0°$ C. $(-121°$ to $+32°$ F.). The amount of water or alcohol employed may be selected from within the range of 0.5 to 100 moles per 100 moles of the titanium compound while the optimum amount of alcohol depends somewhat upon the alcohol that is selected. By way of example, good yields of polymer are obtained with 1.5 to 50 moles methanol per 100 moles of titanium compound; 1.25 to 80 moles ethanol per 100 moles of titanium compound; 2 to 30 moles of n-propanol per 100 moles of titanium compound; 1 to 20 moles n-octanol per 100 moles of titanium compound; and 1 to 20 moles dodecanol per 100 moles of titanium compound. When the reduction of the titanium compound by the organo aluminum compound is carried out in the presence of water, the preferred amount of water is within the range of 1.25 to 5 moles per 100 moles of titanium compound.

It has been found that, at a given temperature, the activity of the catalytic system is a function of the quantities in the system of active oxygen, of $Ti^{+++}$ compound obtained by reduction, and "free" organo aluminum compound. The term "quantity of free organo aluminum compound" refers to the quantity of organo aluminum compound which has not been used to reduce the titanium$^{++++}$ compound.

In the preferred practice of this invention, it is desirable to utilize the following ingredients in the following proportions:

peroxygenated (b) compound, expressed in weight of active oxygen, within the range of 0.0005 to 0.2%, and preferably 0.001 to 0.1% in relation to the weight of the monomer compound;
titanium$^{+++}$ compounds, expressed in milliatoms-grams of titanium$^{+++}$, within the range of 0.1 to 10 and preferably 0.3 to 3 per milliatom-gram of active oxygen;
organo aluminum compound, expressed in milliatoms-grams of aluminum, within the range of 0.1 to 50 and preferably 0.3 to 15 per milliatom-gram of active oxygen, corresponding to "free" organo aluminum compound proportions ranging from 0 to 10 and preferably 1 to 4 per milliatom-gram of active oxygen.

The (a) system used in the practice of this invention can be prepared in dry nitrogen or argon atmosphere at a temperature within the range of 0 to 200° C. (32° to 392° F.) and preferably within the range of 30 to 160° C. (86° to 320° F.), by contacting the titanium compound, to which the above mentioned quantities of water or alcohol have been added, and organo-aluminum compound in the ratio of aluminum atoms of the organo aluminum compound to titanium atoms of the titanium compound of at least 1, with or without the presence of 0 to 5% by weight, in relation to the weight of the monomer compound used, of a solvent which is inert to both of the metallic compounds. Solvents which can advantageously be used in the preparation of the (a) system are illustrated by saturated hydrocarbons such as hexane and methylcyclohexane and perfluorated or chlorofluorated compounds, or mixtures of saturated hydrocarbons, the boiling points of which may be as high as 240° C. (464° F.).

In the preferred practice of the method of this invention, it is advantageous to effect the contact between the two metallic components in a ratio of Al/Ti=1 and then add to the composition obtained the amount of organo aluminum compound corresponding to the desired quantity of "free" organo aluminum compound. It has also been discovered that, in order to obtain better yield of polymer, it is preferred to add the water or alcohol to the titanium compound rather than to the organo aluminum compound, although, in the latter case, the reduction of the titanium compound by the organo aluminum compound is also quite easy.

The different components of the catalytic system of this invention may be introduced into the reactive zone of polymerization in any desired order, but better yield rates are obtained when the introduction of the peroxygenated (b) compound precedes that of the (a) system.

The catalytic system of this invention may be used to carry out the different techniques of mass polymerization of monomer compounds, based on vinyl chloride, and particularly the methods described in the following French patents: No. 1,079,772, filed on July 20, 1952, No. 1,257,780, filed on Feb. 26, 1960, No. 1,357,736, filed on Feb. 26, 1963, No. 1,382,072, filed on Mar. 1, 1963, No. 1,436,744 and No. 1,436,464, filed on Mar. 17, 1965, No. 1,493,610 and No. 1,505,390, filed on June 28, 1966.

The present invention also includes the polymers and copolymers having a vinyl chloride base, which are obtained by the polymerization in the presence of the catalytic system of this invention. The polymers and copolymers based upon vinyl chloride, in accordance with the practice of this invention, have better heat stability, high deformation temperature under load and improved solvent resistance. The polymers and copolymers are resistant to boiling water or chlorinated solvents such that the polymers or copolymers may be extruded or calendered to form films, fibers or tubes having improved characteristics.

The following examples are given by way of illustration, but not by way of limitation, of the practice of this invention:

EXAMPLE 1

In a 200 ml. flat bottom flask, provided with a magnetic agitator, a cooling system and a thermometer, 30 milliatoms-grams titanium in the form of 37.5 ml. of a solution of 0.80 mole of n-propyl titanate in trichlorotrifluoroethane, having the formula $CF_2Cl$—$CFCL_2$ and a boiling point of about 48° C., are introduced, after purging the flask with pure nitrogen containing less than 10 p.p.m. by volume of oxygen and less than 5 p.p.m. by volume of water. While maintaining the temperature at 50° C., 90 milliatoms-grams aluminum are added rapidly dropwise in the form of a 37.5 ml. solution of 2.40 moles triethyl aluminum in trichlorofluoroethane.

Both metallic components are allowed to remain in contact for 3 hours. Thereafter the hydrolysis and the dosage of the suspension obtained are carried out as follows: 2 ml. of said suspension are removed under agitation and transferred, under nitrogen, into a bottle into which 10 ml. 6 N hydrochloric acid, 100 ml. deaerated water, 20 ml. 0.2 N ferric alum have been introduced. The mixture is agitated under nitrogen until the disappearance of the dark coloration in the organic phase, 5 ml. orthophosphoric acid are then added in order to complex the ferric ions; the dosage is effected with 0.1 N potassium bichromate in the presence of 5 drops of a 0.5% aqueous solution of barium diphenylamine sulfonate as indicator.

It will be noticed that 95.9% of the titanium has been converted into titanium$^{+++}$.

600 grams dry vinyl chloride, containing less than 0.01% water, are placed into a one liter double-jacketed autoclave having an anchor agitator. The autoclave is drained by degasification of 100 grams vinyl chloride, then cooled under nitrogen to −40° C. Subsequently, 7.5 milliatoms-grams active oxygen are introduced in the form of 4.02 ml. of a monochloroacetyl peroxide solution in dimethyl phthalate, titering 2.96 grams active oxygen per 100 ml. of solution, followed by a quantity of the suspension of the prepared (a) system corresponding to 5 milliatoms-grams titanium$^{+++}$ and 10.6 milliatoms-grams "free" aluminum.

After 5 hours of polymerization, 44 grams of resin, corresponding to an hourly yield of 1.76%, are recovered.

EXAMPLE 2

An n-propyl triethyl aluminum titanate system, in suspension in trichlorotrifluoroethane, is prepared by contacting at 50° C., 30 milliatoms-grams titanium in the form of the n-propyl titanate solution used in Example 1 with water added at the rate of 0.025 mole of water per mole of titanate, plus 90 milliatoms-grams of aluminum in the form of the triethylaluminum solution used in Example 1.

After the two metallic components have been in contact for 3 hours, it will be noted that 100% of the titanium has been reduced to titanium$^{+++}$.

As in Example 1, 500 grams vinyl chloride are polymerized at −40° C. in the presence of 7.5 milliatoms-grams active oxygen, in the form of the monochloroacetyl solution, used in Example 1, and of a quantity of the suspension of the (a) system prepared above, corresponding to 5 milliatoms-grams titanium$^{+++}$ and 10 milliatoms-grams "free" aluminum.

96 grams of resin, corresponding to an average hourly output of 3.84% are recovered after 5 hours of polymerization.

EXAMPLE 3

30 ml. of a molar triethylaluminum solution in a petroleum fraction with a boiling point between 140° and 230° C., hereinafter referred to as fraction "A," are introduced into the flask used in Example 1. Addition is made rapidly dropwise at 15° C., of 30 ml. of an n-propyl titanate molar solution in fraction "A"; the quantities of the two metallic components used correspond to 30 milliatoms-grams titanium and 30 milliatoms-grams aluminum.

The composition obtained is heated at 140° C. under nitrogen with agitation.

After a contact time of 3 hours and 20 minutes, 60.8% of the titanium will have been converted to titanium$^{+++}$.

500 grams vinyl chloride are polymerized as in Example 1, at −40° C., in the presence of 7.5 milliatoms-grams active oxygen in the form of the monochloroacetyl peroxide solution used in Example 1, plus a quantity of the suspension of the (a) system prepared above, corresponding to 5 milliatoms-grams titanium$^{+++}$ and 4.3 milliatoms-grams "free" aluminum and an additional 3.2 milliatoms-grams aluminum in the form of triethylaluminum.

62.5 grams of resin, corresponding to an average hourly output of 2.5%, are recovered after 5 hours of polymerization.

EXAMPLE 4

A mixture of water and n-propyl titanate is prepared by adding 0.375 millimole water to 30 ml. of a molar n-propyl titanate solution in fraction "A" which corresponds to 1.25 moles of water per 100 moles titanate. The mixture obtained is transferred dropwise at 15° C. into 30 ml. of a molar triethylaluminum solution in fraction "A." The quantities of both metal compounds used correspond to 30 milliatoms-grams titanium and 30 milliatoms-grams aluminum.

The compound obtained is heated under nitrogen and with agitation at 140° C.

After 3 hours and 20 minutes of contacting, 84.3% of the titanium will have been converted into titanium$^{+++}$.

As in Example 1, 500 grams vinyl chloride are polymerized at −40° C. in the presence of 7.5 milliatoms active oxygen in the form of the monochloroacetyl peroxide solution used in Example 1, and a quantity of the suspension of the (a) system prepared above, corresponding to 5 milliatoms-grams titanium$^{+++}$ and 0.93 milliatom-gram "free" aluminum and 6.57 milliatoms-grams of additional aluminum in the form of triethylaluminum.

80 grams of resin, corresponding to an average hourly yield of 3.2%, are recovered after 5 hours of polymerization.

EXAMPLE 5

As in Example 4, an (a) system is prepared in the presence of 0.75 millimole of water instead of 0.375 millimole, corresponding to 2.5 moles of water per 100 moles of titanate.

After a contact time of 3 hours and 20 minutes at 140° C. of both metallic components, it is noticed that 91% of the titanium have been converted into titanium$^{+++}$.

As in Example 1, 500 grams vinyl chloride are polymerized at −40° C. in the presence of 7.5 milliatoms active oxygen in the form of the monochloroacetyl peroxide solution used in Example 1, a quantity of the suspension of the (a) system prepared above, corresponding to 5 milliatoms titanium$^{+++}$ and to 0.50 milliatom-gram of "free" aluminum, and of 7 milliatoms-grams of additional aluminum, in the form of triethylaluminum.

98 grams resin are recovered after 5 hours of polymerization, which corresponds to an average hourly yield of 3.92%.

EXAMPLE 6

As in Example 4, an (a) system is prepared in the presence of 1.50 millimoles of water instead of 0.75 millimole, which corresponds to 5 moles of water per 100 moles of titanate.

After a contact of 3 hours and 20 minutes at 140° C. between both metallic components it is noticed that 88.6% of the titanium will have been converted into titanium$^{+++}$.

As in Example 1, 500 grams vinyl chloride are polymerized at −40° C. in the presence of 7.5 milliatoms-grams active oxygen in the form of the monochloroacetyl peroxide solution used in Example 1, of a quantity of the suspension of the (a) system prepared above, corresponding to 5 milliatoms-grams of titanium$^{+++}$ and 0.64 milliatom-gram of "free" aluminum, and 6.86 milliatoms-grams of additional aluminum in the form of triethylaluminum.

After 5 hours of polymerization 69 grams of resin are recovered which corresponds to an average hourly yield of 2.76%.

EXAMPLE 7

As in Example 4, an (a) system is prepared in the presence of 0.6 millimole methanol instead of 0.375 millimole of water, corresponding to 2 millimoles of methanol per 100 moles of titanate.

After a contact of 3 hours and 20 minutes at 140° C. of the two metallic substances it is noticed that 99.4% of the titanium will have been converted into titanium$^{+++}$.

As in Example 1, 500 grams vinyl chloride are polymerized at −40° C. in the presence of 7.5 milliatoms-grams active oxygen in the form of the monochloroacetyl peroxide solution used in Example 1, of a quantity of the suspension of the (a) system prepared above, corresponding to 5 milliatoms titanium$^{+++}$ and an additional 7.5 milliatoms-grams aluminum in the form of trethylaluminum.

79 grams of resin, corresponding to an hourly average yield of 3.16% are recovered after a polymerization of 5 hours.

EXAMPLE 8

As in Example 6, an (a) system is prepared from 9 millimoles of methanol instead of 0.6 millimole, corresponding to 30 moles of methanol per 100 moles of titanate.

After the two metallic components have been in contact for 3 hours and 20 minutes at 140° C., it is noted that 96.2% of the titanium will have been converted into titanium$^{+++}$.

As in Example 1, 500 grams vinyl chloride are polymerized at −40° C. in the presence of 7.5 milliatoms-grams active oxygen in the form of the monochloracetyl peroxide solution used in Example 1, a quantity of the suspension of the (a) system prepared above, corresponding to 5 milliatoms-grams titanium$^{+++}$ and 0.2 milliatom-gram of free aluminum, and 7.3 milliatoms-grams of additional aluminum in the form of eriethylaluminum.

84 grams of resin, corresponding to an hourly yield of 3.36%, are recovered after 5 hours of polymerization.

EXAMPLE 9

As in Example 4, an (a) system is prepared in the presence of 0.375 millimole of ethanol instead of water, corresponding to 1.25 moles of ethanol per 100 moles of titanate.

After both metallic substances have been in contact for 3 hours and 20 minutes at 140° C., it is noted that 99.6% titanium will have been converted into titanium$^{+++}$.

As in Example 1, 500 grams vinyl chloride are polymerized at —40° C., in the presence of 7.5 milliatoms-grams active oxygen in the form of the monochloroacetyl peroxide solution used in Example 1, of a quantity of the suspension of the (a) system prepared above, corresponding to 5 milliatoms-grams titanium$^{+++}$ and an additional 7.5 milliatoms-grams of aluminum in the form of triethylaluminum.

75 grams of resin, corresponding to an average hourly yield of 3%, are recovered after 5 hours of polymerization.

EXAMPLE 10

As in Example 9, an (a) system is prepared in the presence of 1.12 millimoles of ethanol, instead of 0.375 millimole, corresponding to 3.75 moles per 100 moles of titanate.

After both metallic components have been in contact for 3 hours and 20 minutes at 140° C., it is noted that 94.3% of the titanium will have been converted into titanium$^{+++}$.

As in Example 1, 500 grams vinyl chloride are polymerized in the presence of 7.5 milliatoms-grams active oxygen in the form of the monochloroacetyl solution used in Example 1, a quantity of the suspension of the (a) system prepared above, corresponding to 5 milliatoms-grams titanium$^{+++}$ and to 0.3 milliatoms "free" aluminum and of an additional 7.2 milliatoms-grams aluminum in the form of triethylaluminum, at —40° C.

76.5 grams of resin, corresponding to an hourly average yield of 3.06%, are recovered after 5 hours of polymerization.

EXAMPLE 11

As in Example 9, an (a) system is prepared in the presence of 7.5 millimoles ethanol, instead of 0.375 millimole, corresponding to 25 moles per 100 moles of titanate.

After both metallic components have been in contact for 3 hours and 20 minutes at 140° C., it is noted that 97.8% of the titanium have been converted into titanium$^{+++}$.

As in Example 1, 500 grams vinyl chloride are polymerized at —40° C. in the presence of 7.5 milliatoms-grams active oxygen, in the form of the monochloroacetyl peroxide solution used in Example 1, a quantity of the suspension of the (a) system prepared above, corresponding to 5 milliatoms-grams of titanium$^{+++}$ and 0.12 milliatom-gram "free" aluminum and of 7.38 milliatoms-grams of additional aluminum, in the form of triethylaluminum.

88 grams of resin are recovered after 5 hours of polymerization, which corresponds to an average hourly yield of 3.52%.

EXAMPLE 12

As in Example 9, an (a) system is prepared in the presence of 21 millimoles ethanol instead of 0.375 millimole, corresponding to 70 moles per 100 moles of titanate.

After both metallic components have been in contact for 3 hours and 20 minutes at 140° C. it is noted that 97.6% of the titanium will have been reduced to titanium$^{+++}$.

As in Example 1, 500 grams vinyl chloride are polymerized at —40° C. in the presence of 7.5 milliatoms-grams active oxygen, in the form of the monochloroacetyl peroxide solution used in Example 3, a quantity of the suspension of the (a) system prepared above, corresponding to 5 milliatoms-grams of titanium$^{+++}$ and to 0.13 milliatom-gram of free aluminum, and an additional 7.37 milliatoms-grams of aluminum in the form of triethylaluminum.

75 grams of resin are recovered after 5 hours of polymerization, which corresponds to an average hourly yield of 3%.

EXAMPLE 13

As in Example 4, an (a) system is prepared in the presence of 0.9 millimole propanol instead of 0.375 millimole water, corresponding to 3 moles propanol per 100 moles of titanate.

After both metallic compounds have been in contact for 3 hours and 20 minutes at 140° C. it is noted that 98% of the titanium will have been converted into titanium$^{+++}$.

As in Example 1, 500 grams vinyl chloride are polymerized at —40° C. in the presence of 7.5 milliatoms-grams active oxygen, in the form of the monochloroacetyl peroxide solution used in Example 1, a quantity of the suspension of the (a) system prepared above, corresponding to 5 milliatoms-grams titanium$^{+++}$ and 0.1 milliatom-gram "free" aluminum and of 7.4 milliatoms-grams of additional aluminum in the form of triethylaluminum.

89 grams of resin, corresponding to an average hourly yield of 3.56%, are recovered after 5 hours of polymerization.

EXAMPLE 14

As in Example 13, an (a) system is prepared in the presence of 1.5 millimoles propanol in lieu of 0.9 millimole, corresponding to 5 moles per 100 moles titanium.

After both metallic compounds have been in contact for 3 hours and 20 minutes at 140° C. it is noted that 91% of the titanium will have been converted into titanium$^{+++}$.

As in Example 1, 500 grams vinyl chloride are polymerized at —40° C. in the presence of 7.5 milliatoms-grams active oxygen, in the form of the monochloroacetyl peroxide solution used in Example 1, a quantity of the suspension of the (a) system prepared above, corresponding to 5 milliatoms-grams titanium$^{+++}$ and 0.5 milliatom "free" aluminum, and of 7 milliatoms-grams of additional aluminum in the form of triethylaluminum.

85 grams of resin, corresponding to an average hourly yield of 3.4% are recovered after 5 hours of polymerization.

EXAMPLE 15

As in Example 13, an (a) system is prepared in the presence of 3 millimoles propanol instead of 0.9 millimole, corresponding to 10 moles per 100 moles of titanate.

After both metallic components have been in contact for 3 hours and 20 minutes at 140° C. it is noted that 94.8% of the titanium will have been converted into titanium$^{+++}$.

As in Example 1, 500 grams vinyl chloride are polymerized at —40° C. in the presence of 7.5 milliatoms-grams active oxygen in the form of the monochloroacetyl peroxide solution used in Example 1, of a quantity of the suspension of the (a) system prepared above, corresponding to 5 milliatoms-grams titanium$^{+++}$ and 0.27 milliatom-gram "free" aluminum and an additional 7.23 milliatoms-grams aluminum in the form of triethylaluminum.

85 grams resin, corresponding to an average hourly yield of 3.4%, are recovered after 5 hours of polymerization.

EXAMPLE 16

An (a) system is prepared as in Example 14, in the presence of 1.5 millimoles propanol, but the propanol is no longer introduced into the titanate solution, but into the triethylaluminum solution.

After both metallic components have been in contact for 3 hours and 20 minutes at 140° C., it is noted that 91.2% of the titanium will have been converted into titanium$^{+++}$.

As in Example 1, 500 grams vinyl chloride are polymerized at −40° C., in the presence of 7.5 milliatoms-grams active oxygen in the form of the monochloroacetyl peroxide solution used in Example 1, of a quantity of the suspension of the (a) system prepared above, corresponding to 5 milliatoms-grams titanium$^{+++}$ and 0.8 milliatom-gram "free" aluminum, and an additional 6.7 milliatoms-grams aluminum, in the form of triethylaluminum.

70 grams resin, corresponding to an average hourly yield of 2.8%, are recovered after 5 hours of polymerization.

EXAMPLE 17

An (a) system is prepared as in Example 4, in the presence of 0.6 millimole n-octanol, instead of 0.375 millimole of water, corresponding to 2 moles of n-octanol per 100 moles of titanate.

After both metallic components have been in contact for 3 hours and 20 minutes at 140° C. it is noted that 95.1% of the titanium will have been converted into titanium$^{+++}$.

As in Example 1, 500 grams vinyl chloride are polymerized at −40° C., in the presence of 7.5 milliatoms-grams of active oxygen, in the form of the monochloroacetyl peroxide solution used in Example 1, of a quantity of the suspension of the (a) system prepared above, corresponding to 5 milliatoms-grams titanium$^{+++}$ and 0.25 milliatom-gram "free" aluminum, and an additional 7.25 milliatoms-grams aluminum in the form of triethylaluminum.

80 grams of resin, corresponding to an average hourly yield of 3.2% are recovered after 5 hours of polymerization.

EXAMPLE 18

An (a) system is prepared as in Example 17, in the presence of 1.5 millimoles octanol instead of 0.6 millimole, corresponding to 5 moles per 100 moles of titanate.

After both metallic compounds have been in contact for 3 hours and 20 minutes, it is noted that 93.4% of the titanate will have been converted into titanium$^{+++}$.

As in Example 1, 500 grams vinyl chloride are polymerized at −40° C., in the presence of 7.5 milliatoms-grams active oxygen in the form of the monochloroacetyl peroxide solution used in Example 1, of a quantity of the suspension of the (a) system, prepared above, corresponding to 5 milliatoms-grams titanium$^{+++}$ and 0.35 milliatom-gram "free" aluminum and an additional 7.15 milliatoms-grams aluminum in the form of triethylaluminum.

After 5 hours of polymerization 72 grams of resin, corresponding to an hourly average yield of 2.88%, are recovered.

EXAMPLE 19

An (a) system is prepared as in Example 17, in the presence of 3 millimoles n-octanol instead of 0.6 millimole, corresponding to 10 moles per 100 moles of titanate.

After both metallic components have been in contact for 3 hours and 20 minutes, it is noted that 96% of the titanium will have been converted into titanium$^{+++}$.

As in Example 1, 500 grams vinyl chloride are polymerized at −40° C., in the presence of 7.5 milliatoms-grams active oxygen in the form of the monochloroacetyl peroxide solution used in Example 1, of a quantity of the suspension of the (a) system prepared above, corresponding to 5 milliatoms-grams titanium$^{+++}$ and 0.2 milliatom-gram "free" aluminum and an additional 7.3 milliatoms-grams aluminum in the form of triethylaluminum.

70 grams of resin are recovered after 5 hours of polymerization, corresponding to an average yield of 2.8%.

EXAMPLE 20

An (a) system is prepared as in Example 4, in the presence of 0.3 millimole dodecanol instead of 0.375 millimole water, corresponding to 1 mole of dodecanol per 100 moles of titanate.

After both metallic components have been in contact for 3 hours and 20 minutes, it is noted that 78% of the titanium will have been converted into titanium$^{+++}$.

As in Example 1, 500 grams vinyl chloride are polymerized in the presence of 7.5 milliatoms-grams of active oxygen in the form of monochloroacetyl peroxide solution used in Example 1, of a quantity of the suspension of the (a) system prepared above, corresponding to 5 milliatoms-grams titanium$^{+++}$ and 1.4 milliatoms-grams "free" aluminum and an additional 6.1 milliatoms-grams aluminum, in the form of triethylaluminum.

80 grams of resin, corresponding to an average hourly yield of 3.2% are recovered after 5 hours of polymerization.

EXAMPLE 21

As in Example 20, an (a) system is prepared in the presence of 3 millimoles dodecanol instead of 0.3 millimole, corresponding to 10 moles per 100 moles of titanate.

After both metallic ingredients have been in contact for 3 hours and 20 minutes, it is noted that 77.6% of the titanium will have been converted into titanium$^{+++}$.

As in Example 1, 500 grams vinyl chloride are polymerized at −40° C., in the presence of 7.5 milliatoms-grams active oxygen in the form of the monochloroacetyl peroxide solution used in Example 1, of a quantity of the suspension of the (a) system prepared above, corresponding to 5 milliatoms-grams titanium$^{+++}$ and 1.40 milliatoms-grams "free" aluminum and an additional 6.1 milliatoms-grams aluminum in the form of triethylaluminum.

80 grams of resin, corresponding to an average hourly output of 3.2% are recovered after 5 hours of polymerization.

I claim:
1. In a method for preparing polymers of monomers formed principally of vinyl chloride, the steps of polymerizing in bulk the monomers in the presence of a catalytic system formed of an (a) system obtained by reduction, in the presence of water or primary non-ramified alcohols containing up to 20 carbon atoms, of a titanium compound having the formula

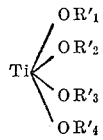

in which $R'_1$, $R'_2$, $R'_3$ and $R'_4$ are the same or different and represent ramified or non-ramified groups selected from the group consisting of alcoyls, aryls and aralkyls which may contain up to 20 carbon atoms, by an organo aluminum compound having the formula

in which $R_1$, $R_2$ and $R_3$ are the same or different and represent ramified aliphatic radicals containing up to 12 carbon atoms, and a peroxygenated (b) compound.

2. The method as claimed in claim 1 in which the peroxygenated compound is selected from the group consisting of the peroxides, hydroperoxides, peresters and peracids.

3. The method as claimed in claim 1 in which the alcohol is selected from the group consisting of methanol, ethanol, n-propanol, n-octanol and dodecanol.

4. The method as claimed in claim 1 in which the titanium compound is selected from the group consisting of n-propyl titanate, isopropyl titanate, isobutyl titanate, butyl titanate and octyl titanate.

5. The method as claimed in claim 1 in which the organo aluminum compound is selected from the group consisting of triethylaluminum and triisobutyl aluminum.

6. The method as claimed in claim 1 in which the peroxygenated compound is selected from the group consisting of perbenzoic acid, perborates, percarbonates, perbenzoates, cumene hydroperoxide, diisopropylbenzene hydroperoxide, t-butyl hydroperoxide, oxygenated water, cyclohexanon peroxide, lauroyl peroxide, benzoyl peroxide, monochloroacetyl peroxide, alphachlorolauroyl peroxide, alpha-chlorocaproyl peroxide and alpha-alpha-dichloropropionyl peroxide.

7. The method as claimed in claim 1 in which the vinyl chloride monomer is copolymerized with a monomer selected from the group consisting of ethylene, propylene, butenes, isobutene, hexene, acrylates, maleates, fumarates, vinyl acetate, acrylonitrile, vinyl fluoride, vinylidene fluoride, and tetrafluorochloroethylene.

8. The method as claimed in claim 1 in which the polymerization is carried out at a temperature within the range of $-100°$ C. to $+30°$ C.

9. The method as claimed in claim 1 in which the polymerization is carried out at a temperature within the range of $-85°$ C. to $0°$ C.

10. The method as claimed in claim 1 in which the water and the non-ramified primary alcohol are employed in an amount within the range of 0.5 to 100 moles per 100 moles of titanium compound.

11. The method as claimed in claim 1 in which the peroxygenated compound is employed in proportions, expressed in weight of active oxygen, within the range of 0.0005 to 0.2 percent in relation to the weight of the monomer.

12. The method as claimed in claim 1 in which the peroxygenated compound is employed in proportions, expressed in weight of active oxygen, within the range of 0.001 to 0.1 percent in relation to the weight of the monomer.

13. The method as claimed in claim 1 in which the titanium compound is employed in the proportion, expressed in milliatoms-grams of titanium reduced to the trivalent state, within the range of 0.1 to 10 per milliatom-gram of active oxygen.

14. The method as claimed in claim 1 in which the titanium compound is employed in the proportion, expressed in milliatoms-grams of titanium reduced to the trivalent state, within the range of 0.3 to 3 per milliatom-gram of active oxygen.

15. The method as claimed in claim 1 in which the organo aluminum compound is employed in proportions, expressed in milliatoms-grams of aluminum, within the range of 0.1 to 50 per milliatom-gram of active oxygen, corresponding to proportions of organo aluminum "free" compounds, expressed in milliatoms-grams of "free" aluminum, within the range of 0 to 10 per milliatom-gram of active oxygen.

16. The method as claimed in claim 1 in which the organo aluminum compound is employed in proportions, expressed in milliatoms-grams of aluminum, within the range of 0.3 to 15 per milliatom-gram of active oxygen, corresponding to proportions of organo aluminum "free" compounds, expressed in milliatom-grams of "free" aluminum, within the range of 1 to 4 per milliatom-gram of active oxygen.

17. Polymers and copolymers based upon vinyl chloride produced by the method of claim 1.

References Cited

UNITED STATES PATENTS 3,300,463    1/1967    De La Mare _____ 260—94.3

FOREIGN PATENTS 665,804    6/1963    Canada _____ 260—92.8
937,275              Great Britain _____ 260—92.8

JOSEPH L. SCHOFER, Primary Examiner

J. A. DONAHUE, JR., Assistant Examiner

U.S. Cl. X.R.

260—85.5, 86.1, 87.1, 87.5, 87.7